(12) United States Patent
Wehrenberg et al.

(10) Patent No.: US 12,252,948 B2
(45) Date of Patent: Mar. 18, 2025

(54) EXTERNAL WELLHEAD SEALING AND CLAMPING SYSTEM

(71) Applicant: KLX Energy Services LLC, Houston, TX (US)

(72) Inventors: Steve Wehrenberg, Mustang, OK (US); Shane Ramsfield, Tuttle, OK (US); Bernt Olsen, Edmond, OK (US)

(73) Assignee: KLX Energy Services LLC, Houston, TX (US)

( * ) Notice: Subject to any disclaimer, the term of this patent is extended or adjusted under 35 U.S.C. 154(b) by 0 days.

(21) Appl. No.: 18/229,042

(22) Filed: Aug. 1, 2023

(65) Prior Publication Data

US 2024/0068317 A1    Feb. 29, 2024

Related U.S. Application Data

(60) Provisional application No. 63/394,390, filed on Aug. 2, 2022.

(51) Int. Cl.
*E21B 33/03* (2006.01)
*F16B 2/08* (2006.01)

(52) U.S. Cl.
CPC ............... *E21B 33/03* (2013.01); *F16B 2/08* (2013.01)

(58) Field of Classification Search
CPC .................................. E21B 33/03; F16B 2/08
See application file for complete search history.

(56) References Cited

U.S. PATENT DOCUMENTS

| | | | | |
|---|---|---|---|---|
| 1,942,213 A * | 1/1934 | Howard | ................ | E21B 33/04 |
| | | | | 285/123.12 |
| 2,137,853 A * | 11/1938 | Nixon | ................ | E21B 33/068 |
| | | | | 285/341 |
| 3,341,227 A * | 9/1967 | Pierce, Jr. | ............ | E21B 33/035 |
| | | | | 285/321 |
| 5,112,140 A * | 5/1992 | Cherny | ................ | E21B 33/08 |
| | | | | 384/38 |
| 5,148,865 A * | 9/1992 | Reed | ................ | E21B 33/0407 |
| | | | | 166/76.1 |
| 5,188,397 A * | 2/1993 | Hynes | ................ | E21B 33/03 |
| | | | | 285/24 |
| 6,962,205 B1 * | 11/2005 | Lay, Jr. | ............ | E21B 33/038 |
| | | | | 166/85.1 |
| 7,032,677 B2 | 4/2006 | McGuire et al. | | |
| 7,997,345 B2 * | 8/2011 | Hannegan | ............ | E21B 33/085 |
| | | | | 175/57 |
| 9,857,011 B2 | 1/2018 | Mair | | |

(Continued)

FOREIGN PATENT DOCUMENTS

CN     203655211 U    6/2014
CN     204299528 U    4/2015

(Continued)

*Primary Examiner* — Aaron L Lembo
(74) *Attorney, Agent, or Firm* — McAfee & Taft (57) ABSTRACT

A seal and clamping system for a wellhead assembly having a housing with a first end configured to seal to the outer adapter surface above an upper outward-projecting shoulder on the wellhead assembly, a second end configured to seal to the tubing head below a lower outward-projecting shoulder, and a clamping system configured to hold the housing in position about the wellhead assembly so as to ensure sealing contact at the upper end and lower end with the wellhead assembly.

18 Claims, 6 Drawing Sheets

(56) References Cited

U.S. PATENT DOCUMENTS 11,525,323 B2 * 12/2022 Semlinger ............... E21B 33/08
2013/0292938 A1 11/2013 Grivetti et al.

FOREIGN PATENT DOCUMENTS

| CN | 204327030 U | 5/2015 |
| CN | 211230347 U | 8/2020 |
| CN | 112065322 A | 12/2020 |
| CN | 216284124 U | 4/2022 |

* cited by examiner

EXTERNAL WELLHEAD SEALING AND CLAMPING SYSTEM

CROSS-REFERENCE TO RELATED APPLICATION

This application claims the benefit of U.S. Provisional Application No. 63/394,390 filed Aug. 2, 2022, which is hereby incorporated by reference.

FIELD

The present disclosure relates generally to apparatuses and methods for preventing or reducing leaks from wellheads, and more particularly to preventing gas (such as methane) from leaking from the components of a wellhead.

BACKGROUND

In the oil and gas industry, a wellhead is the component at the surface of an oil or gas well that provides the structural and pressure-containing interface for the drilling and production equipment. The primary purpose of a wellhead is to provide the suspension point and pressure seals for the casing and/or tubing strings that run from the bottom of the hole sections to the surface pressure control equipment.

When the well has been drilled, it is completed to provide an interface with the reservoir rock and a tubular conduit for the well fluids. The surface pressure control is provided by a Christmas tree, which is installed on top of the wellhead, with isolation valves and choke equipment to control the flow of well fluids during production. Wellheads are typically welded onto the first string of casing, which has been cemented in place during drilling operations, to form an integral structure of the well.

A wellhead serves numerous functions. For example, it provides a means of casing and/or tubing suspension. Also, it provides pressure monitoring and pumping access to annuli between the different casing/tubing strings, as well as providing a reliable means of well access and a means of attaching a well pump,

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure

DETAILED DESCRIPTION

In the description that follows, like parts are marked throughout the specification and drawings with the same reference numerals, respectively. The drawings are not necessarily to scale and the proportions of certain parts have been exaggerated to better illustrate details and features of the invention. In the following description, the terms "inwardly" and "outwardly" are directions toward and away from, respectively, the geometric axis of a referenced object. Where components of relatively well-known designs are employed, their structure and operation will not be described in detail.

In addition, numerous specific details are set forth in order to provide a thorough understanding of the embodiments and examples described herein. However, those of ordinary skill in the art will understand the embodiments and examples described herein can be practiced without these specific details. In other instances, methods, procedures and components have not been described in detail so as not to obscure the related relevant feature being described. Also, the description is not to be considered as limiting the scope of the embodiments described herein.

The embodiments described herein generally relate to seal and clamping systems which can help prevent or reduce leaks from wellheads, especially gas leaks such as methane leaks. The embodiments herein are particularly relevant to preventing or reducing leaks form wells that use a Larkin-style wellhead or a wellhead similar in style.

Figure 1:
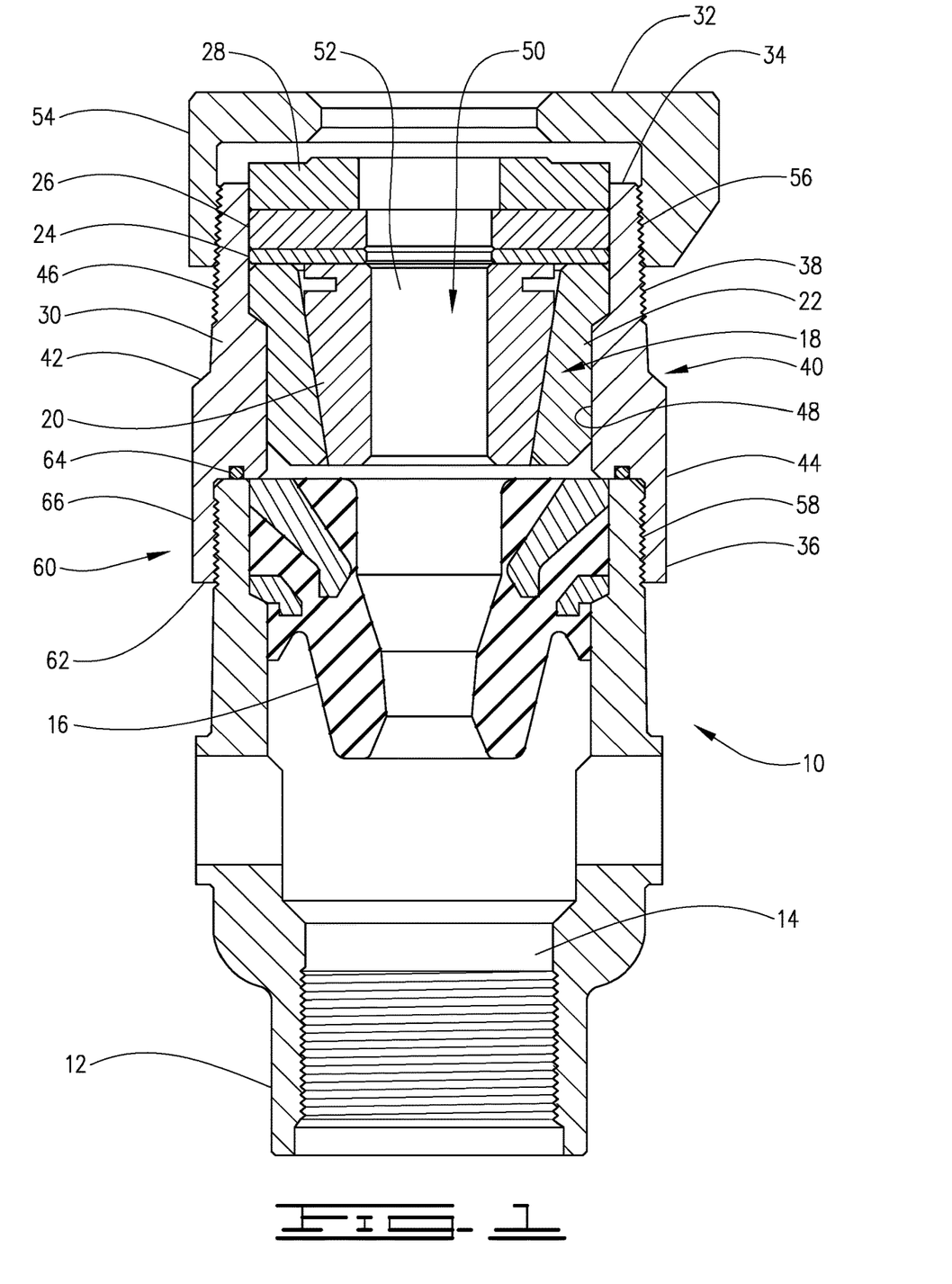
FIG. 1 is a schematic cut-a-way view of the wellhead of FIG. 1.

Referring now to FIGS. 1, there is shown a wellhead assembly 10, which is a style sometimes called a Larkin-style wellhead. As illustrated, wellhead assembly 10 has a tubing head 12 coming up from below. Tubing head 12 defines a central head bore 14. A stripper rubber 16 is inserted into central head bore 14. Above stripper rubber 16 is a slip assembly 18, generally comprising tubing slips 20 and slip bowl 22. Above slip assembly 18 is a bottom packing ring 24 and a top packing ring 28 with a seal ring 26 sandwiched in-between. The slip assembly 18, bottom packing ring 24, seal ring 26 and top packing ring 28 are typically encased within stripper adapter 30; though, in some embodiments top packing ring 28 may only be partially encased and extend out of stripper adapter 30. At the top, is top nut (or top cap) 32, which caps off stripper adapter 30.

Looking closer at stripper adapter 30, it has an upper end 34, a lower end 36, an outer adapter surface 38 and an inner adapter surface 48. Outer adapter surface 38 extends from the upper end 34 to the lower end 36. Outer adapter surface 38 has a first outward-projecting shoulder 40 located between the upper end 34 and lower end 36 so as to define an upward facing ledge 42. As will be appreciated, shoulder 40 and its ledge 42 extend circumferentially around outer adapter surface 38, which is generally cylindrical; though of course, having an outer diameter for its lower portion 44 that is greater than the outer diameter for its upper portion 46.

Inner adapter surface 48 defines a central adapter bore 50 in which slip assembly 18, bottom packing ring 24, seal ring 26 and top packing ring 28 are contained. Additionally, these contained components along with top nut 32 define a smaller bore 52 within central adapter bore 50. Smaller bore 52 extends down to central head bore 14 and allows positioning and operation of well components, such as a polished rod (not shown).

The upper end 34 is configured to mate with the top nut 32 such that a circumferential lip 54 of top nut 32 overlaps a first portion 56 of the outer adapter surface 38 at the upper end 34. Additionally, lower end 36 is configured to mate with the tubing head 12 such that, at the lower end 36, the stripper adapter 30 extends over the upper section 58 of the tubing head 12 so that the outer adapter surface 38 at the lower end 36 forms a second outward-projecting shoulder 60 so as to define a downward facing ledge 62.

Unfortunately, even though seal ring 64 is often provided, it has been discovered that the overlap area 66 can be subject to leaks especially of light gases such as methane. In order to address this issue, the current disclosure provides for a seal/clamping assembly (sometimes referred to herein as "seal/clamping assembly"), which can prevent or at least reduce leakage at overlap area 66.

Turning now to FIGS. 2-7, a seal/clamping assembly 100 is illustrated. Assembly 100 is made up of three major systems: housing system 200, sealing system 300 and a clamping system 400.

Housing system 200 generally will comprise one or more components that form a housing that can surround a wellhead 10 at overlap area 66. Typically, the housing system 200 will comprise two or more sections or portions that can be formed around wellhead 10 so as to be easily assembled in the field on an existing wellhead. Generally, housing system 200 will have a cylindrical form. For example, as can be most easily seen from FIGS. 4 and 5, housing system 200 can comprise two or more mating cylindrical portions, such as first cylindrical portion 201 and second cylindrical portion 202. The cylindrical portions mate to form a cylinder, which in this embodiment is housing system 200 as a cylindrical housing.

Figure 4:
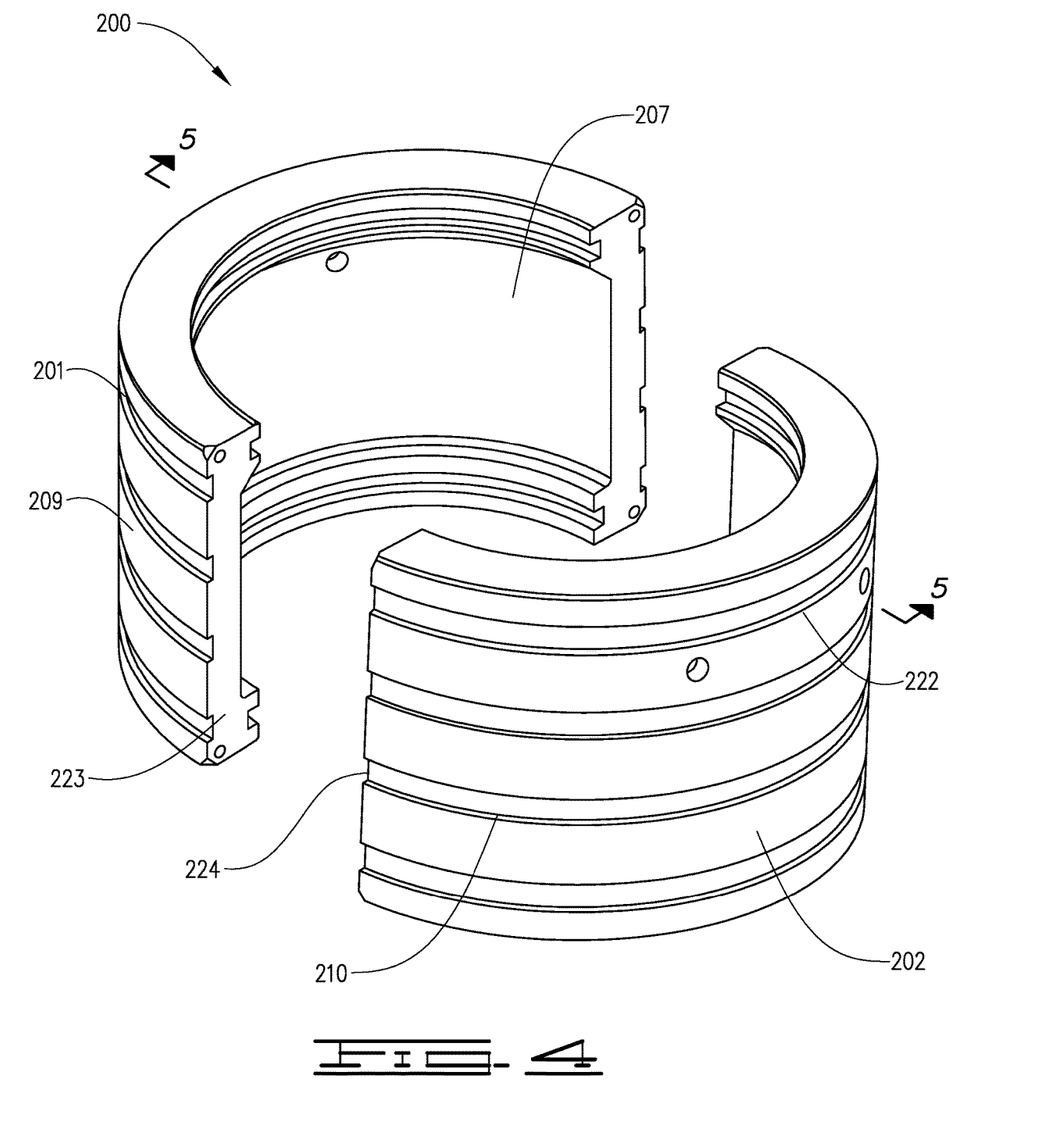
FIG. 4 is a perspective view of a housing system suitable for use in the seal and clamping system.
Figure 5:
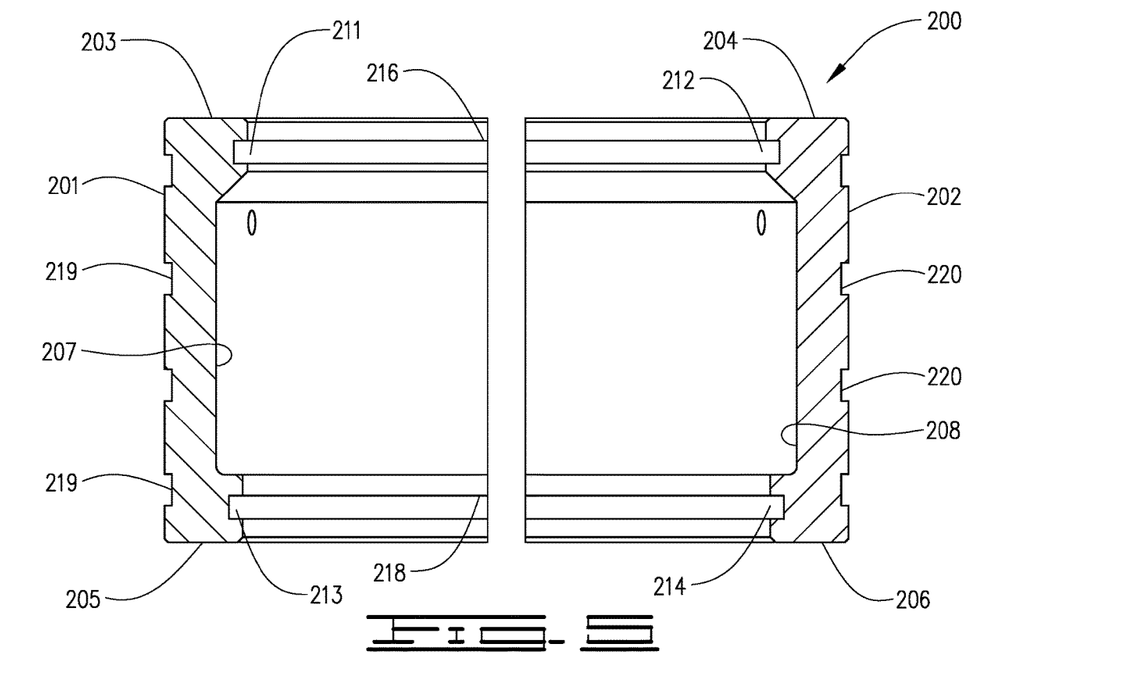
FIG. 5 is a sectional view of the housing system of FIG. 4.

As can be seen from the figures, each cylindrical portion has a first end 203,204; a second end 205,206; an inner curved surface 207,208 extending between the first end and the second end, and an outer curved surface 209, 210 extending between the first end and the second end.

The inner curved surface 207,208 has an upper inner groove 211,212 at the first end, and a lower inner groove 213,214 at the second end. When first cylindrical portion 201 is mated with second cylindrical portion 202, the upper inner grooves 211,212 of the cylindrical portions form a circumferentially-extending upper inner groove 216 and the lower inner grooves 213, 214 of the cylindrical portions form a circumferentially-extending lower inner groove 218. As will be understood, typically grooves 216,218 extend entirely around the inner surface of the mated portions of housing 200.

The outer curved surface 209,210 has a plurality (typically at least three and generally four) outer grooves 219,220 longitudinally spaced apart on the outer curved surface 209,210. When the first cylindrical portion 201 is mated with the second cylindrical portion 202, the outer grooves form a series of spaced-apart circumferentially-extending outer grooves 222, made up of four such grooves in the illustrated embodiment. As will be understood, typically grooves 222 extend entirely around the outer surface of the pated portions of housing 200.

In use, the cylindrical portions mate around a portion of the outer adapter surface and an upper section of the tubing head so that the circumferentially-extending upper inner groove 216 is above the outward-projecting shoulder 40 and the circumferentially-extending lower inner grove 218 is below the second outward projection shoulder 60.

Figure 8:
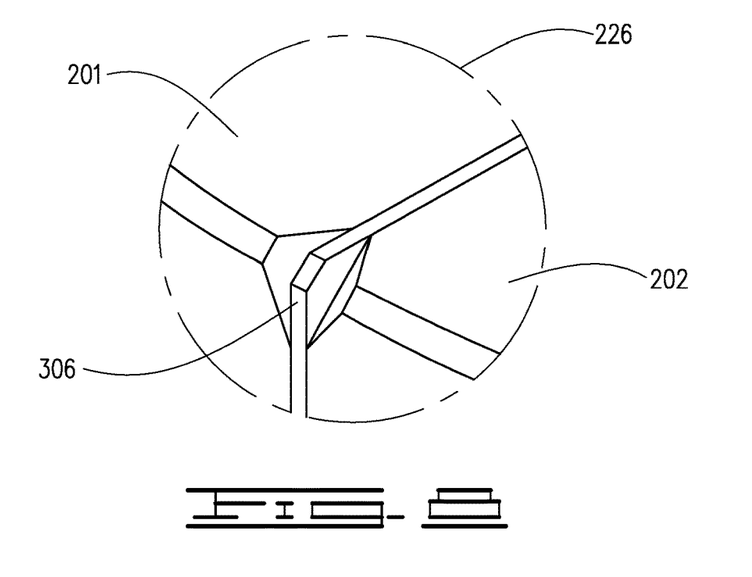
FIG. 8 is an enlargement of a portion of the housing system as appearing in FIG. 2.

As will be realized from the above and the figures, the cylindrical portions have mating sides 223,224. In some embodiments, at least one of the mating sides has a notch 226 (see FIG. 8), which can be at the first end and/or second end. The notch 226 facilitates separation of the cylindrical portions. For example, as chisel can be used at notch 226 to separate the cylindrical portions.

Figure 3:
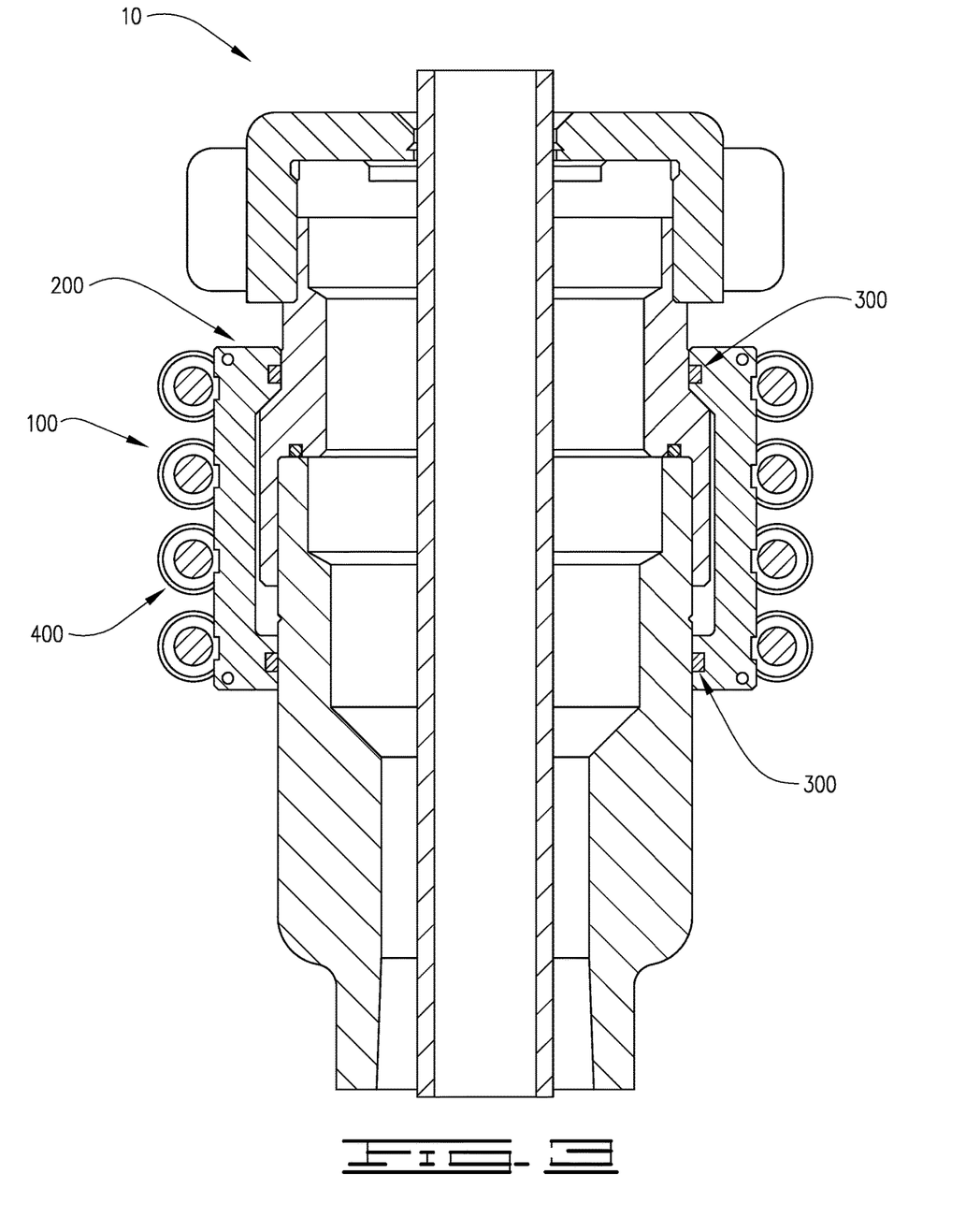
FIG. 3 is a sectional view of the wellhead and seal/clamping assembly illustrated in FIG. 2.
Figure 7:
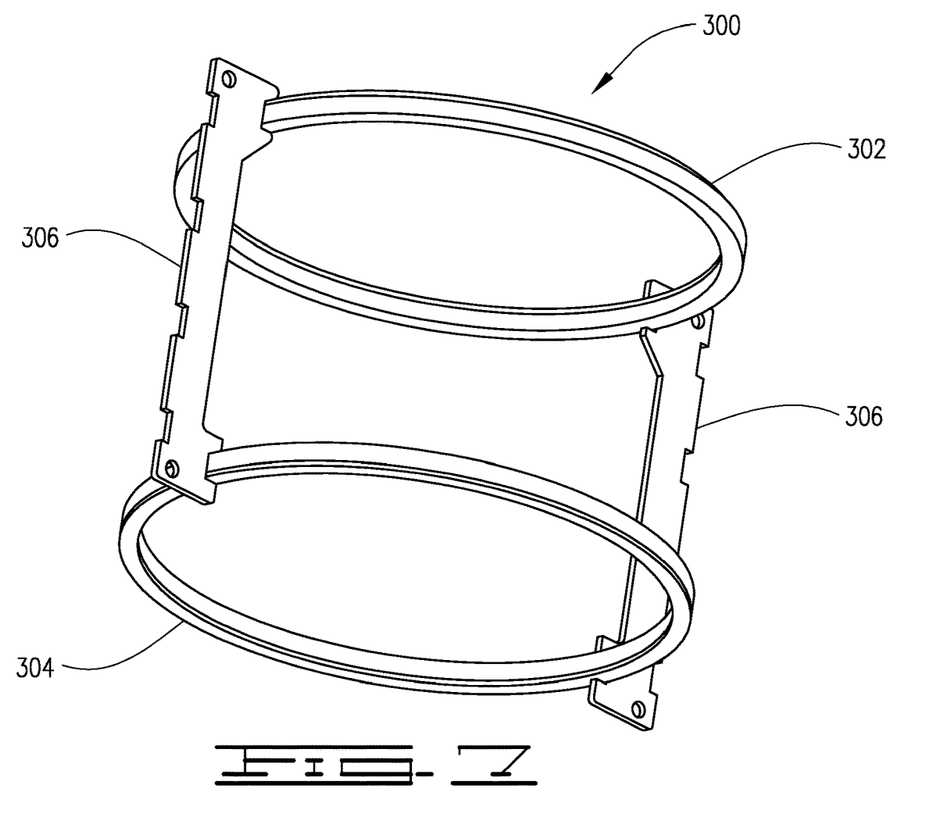
FIG. 7 is a perspective views of one embodiment of a seal system useful in the seal and clamping system of this disclosure.

As most easily seen from FIGS. 3 and 7, seal system 300 provides plastic or rubber sealing gaskets to prevent leakage through the seal/clamping assembly. Seal ring 300 can comprise an upper seal ring 302, a lower seal ring 304, and a plurality of longitudinal gaskets 306.

In use, seal system 300 is positioned such that the upper seal ring 302 is in the circumferentially-extending upper inner groove 216, the lower seal ring 304 is in the circumferentially-extending lower inner groove 218, and the longitudinal gaskets 306 are positioned between the cylindrical portions; Thus, in use, the longitudinal gaskets 306 extend longitudinally between the upper seal ring 302 and lower seal ring 304. As will be realized, there typically will be one longitudinal gasket per pair of mating sides for the cylindrical portions. Thus, if two cylindrical portions are used (as illustrated), then there are two pairs of mating sides and two gaskets would be used.

As will be realized from the above disclosure and FIG. 3, in use upper seal ring 302 will be positioned above the outward-projecting shoulder 40, and lower seal ring 304 will be positioned below the second outward projection shoulder 60.

Figure 2:
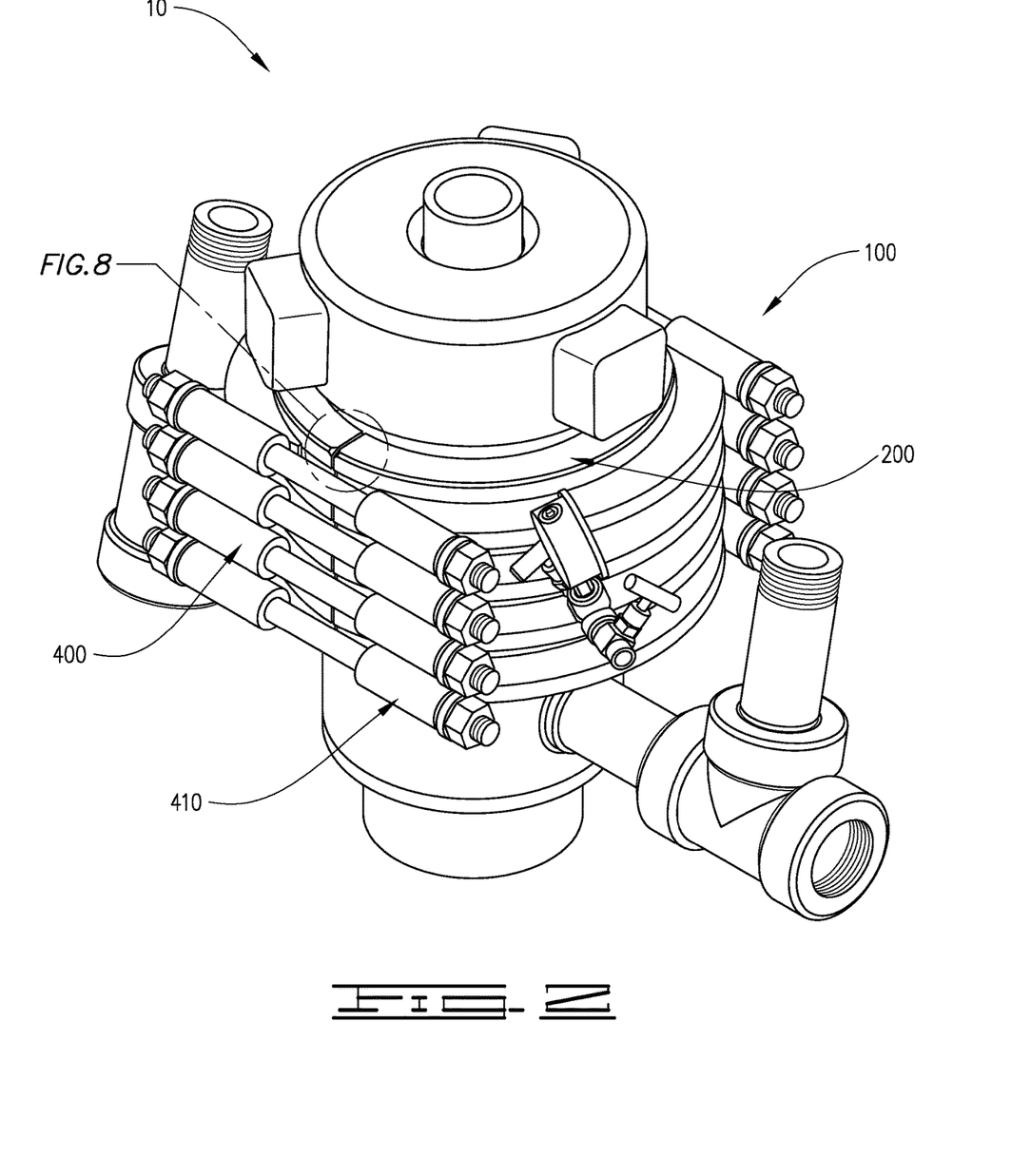
FIG. 2 is a perspective view of a wellhead using the seal and clamping ("seal/clamping") assembly of the current disclosure.
Figure 6:
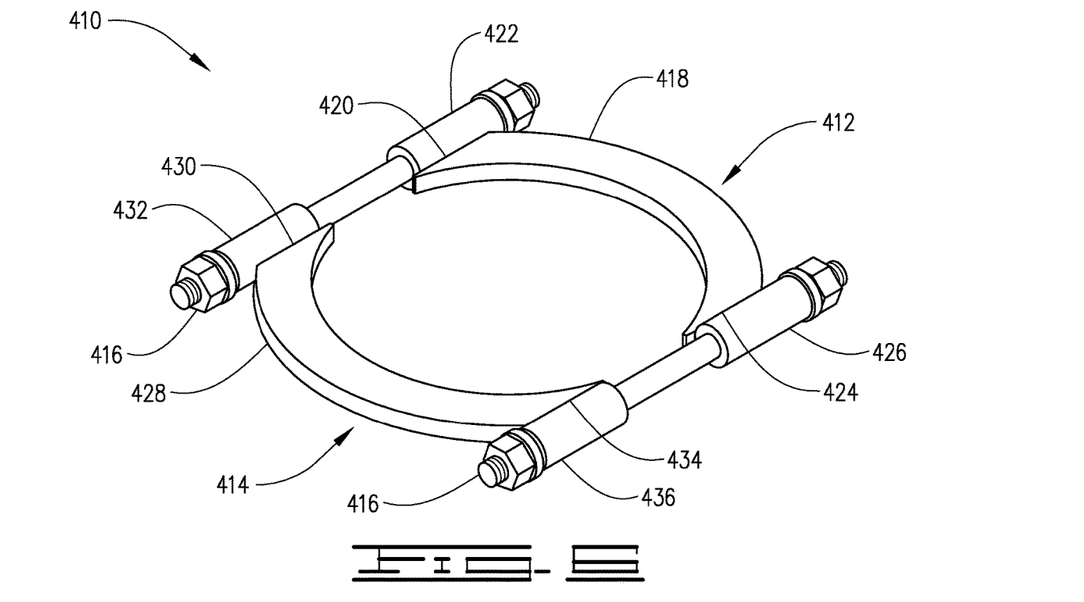
FIG. 6 is a perspective view of one embodiment of a clamp that can be used in the clamping assembly of the sealing assembly of this disclosure.

As most easily seen from FIGS. 2, 3 and 6, clamping system 400 provides for a secure clamping of housing system 200 and seal system 300 in place to ensure a fluid-tight seal is made with wellhead 10 and between the components of the housing system 200 and the seal system 300. Generally, in any embodiment, the clamping system 400 should be considered to so secure the housing system 200 and seal system 300 to the wellhead 10.

In the embodiment illustrated, clamping system 400 comprises a plurality of clamps 410. While two or more clamps can be used, typically at least three clamps will be used, and more typically four or more clamps will be used. Each of the clamps 410 is positioned in a respective circumferentially-extending outer groove of the series of spaced-apart circumferentially-extending outer grooves 222, so as to hold the cylindrical portions of the housing system in matting position about the wellhead assembly 10, ensure sealing contact of the mating sides with gasket 306, and to ensure sealing contact of the upper seal ring 302 and lower seal ring 304 with the wellhead assembly 10.

For example, each of the clamps 410 may comprise a first saddle 412, a second saddle 414 and a connection assembly, such as connecting bolts and nuts 416 along with tubes 422,432 or 426,436 or other suitable connection assembly. First saddle 412 has a first arched member 418, which is configured to mate into groove 222. At a first end 420 of first arched member 418 there is a first tube 422, and at a second end 424 of the first arched member 418 there is a second tube 426. Likewise, for second saddle 414, there is second arch member 428 (configured to mate into groove 222), and at a first end 430 of second arched member 428 there is a first tube 432, and at a second end 434 of the second arched member 428 there is a second tube 436.

In use, the connecting bolts and nuts 416 are used to connect the first saddle 412 to the second saddle 414 by passing the bolts through the tubes. Thus, a bolt 416 extends through the first tube 422 attached to the first arched member 418 and through the first tube 432 attached to the second arched member 428. Likewise, another bolt 416 extends through the second tube 426 attached to the first arched member 418 and through the second tube 436 attached to the second arched member 428. Once in place, the bolts can be secured by the nuts to a suitable tension.

The seal/clamping systems of this disclosure can be further understood by the following numbered embodiments.

Embodiment 1: a seal and clamping system for a wellhead assembly, wherein the wellhead assembly is of the type comprising:
- a top cap having a lower circumferential lip;
- a tubing head defining a central head bore, the tubing head having an upper section and lower section;
- a stripper adapter, the stripper adapter having:
  - an upper end;
  - a lower end;
  - an outer adapter surface extending from the upper end to the lower end, wherein the outer adapter surface has a first outward-projecting shoulder between the upper end and lower end so as to define an upward facing ledge; and
  - an inner adapter surface defining a central adapter bore, and
  - wherein the upper end is configured to mate with the top cap such that the circumferential lip overlaps a first portion of the outer adapter surface at the upper end, and the lower end is configured to mate with the tubing head such that at the lower end the stripper adapter extends over the upper section of the tubing head so that the outer adapter surface at the lower end forms a second outward-projecting shoulder so as to define an downward facing ledge; and
- wherein the seal/clamping assembly comprises:
  - a housing having:
    - a first end configured to seal to the outer adapter surface above the first outward-projecting shoulder;
    - a second end configured to seal to the tubing head below the second outward-projecting shoulder;
    - an inner curved surface extending between the first end and the second end; and
    - an outer curved surface extending between the first end and the second end; and
  - a clamping system configured to hold the housing in position about the wellhead assembly so as to ensure sealing contact at the upper end and lower end with the wellhead assembly.

Embodiment 2: the seal and clamping system of embodiment 1, wherein the seal and clamping system further comprises a seal system having an upper seal ring which seals the first end of the housing to the outer adapter surface, and a lower seal ring which seals the second end of the housing to the tubing head.

Embodiment 3: the seal and clamping system of either embodiment 1 or 2, wherein the housing comprises at least two mating portions which mate to form the housing.

Embodiment 4: the seal and clamping system of any of embodiments 1 to 3, wherein the mating portions have mating sides, and at least one of the mating sides has a notch, which facilitates separation of the cylindrical portions.

Embodiment 5: the seal and clamping system of either embodiment 3 or 4, wherein each mating portion has an upper inner groove at the first end of the inner curved surface, and a lower inner groove at the second end of the inner curved surface, and wherein when the cylindrical portions are mated, the upper inner grooves of the cylindrical portions form a circumferentially-extending upper inner groove and the lower inner grooves of the cylindrical portions form a circumferentially-extending lower inner groove.

Embodiment 6: the seal and clamping system of embodiment 5, wherein the mating portions of the housing are configured to mate around the wellhead assembly, and when the seal/clamping assembly is so mated, the mating portions mate around the second portion of the outer adapter surface and an upper section of the tubing head so that the circumferentially-extending upper inner groove is above the first outward-projecting shoulder, and the circumferentially-extending lower inner grove is below the second outward projection shoulder.

Embodiment 7: the seal and clamping system of embodiment 6, wherein the seal and clamping system further comprises a seal system having an upper seal ring, a lower seal ring and a plurality of longitudinal gaskets extending between the upper seal ring and lower seal ring; and wherein when the mating portions are mated the seal/clamping assembly is positioned such that the upper seal ring is in the upper inner groove, the lower seal ring is in the lower inner groove, and the longitudinal gaskets are positioned between the mating portions.

Embodiment 8: the seal and clamping system of any of embodiments 1 to 7, wherein the outer curved surface of the housing comprises a plurality of grooves spaced longitudinally apart on the outer curved surface, and wherein when the mating portions are mated, the outer grooves form a series of spaced-apart circumferentially-extending outer grooves and wherein the clamping system is configured to mate with the series of spaced-apart circumferentially-extending outer grooves so as to hold the housing in mating position and in sealing contact with the wellhead assembly.

Embodiment 9: the seal and clamping system of embodiment 8, wherein the clamping system comprises a plurality of clamps with each one of the clamps corresponding to a respective one of the circumferentially-extending outer grooves.

Embodiment 10: the seal and clamping system of embodiment 9, wherein each of the clamps comprise:
- a first saddle having a first arched member which mates into a first portion of one of the circumferentially-extending outer grooves;
- a second saddle having a second arched member, which mates into a second portion of the one of the circumferentially-extending outer grooves; and
- a connector which connects the first saddle to the second saddle.

Embodiment 11: the seal and clamping system of embodiment 10, wherein:
- the first saddle further comprises a first tube at a first end of the first arched member and a second tube at a second end of the first arched member;
- the second saddle further comprises a first tube at a first end of the second arched member and a second tube at a second end of the second arched member; and
- the connector comprises a first bolt and a second bolt for joining the first arched member to the second arched member wherein, when so joined, the first bolt extends through the first tube of the first arched member and the first tube of the second arched member, and the second bolt extends through the second tube of the first arched member and the second tube of the second arched member.

Embodiment 12: the seal and clamping system of embodiment 11, wherein the clamping system comprises at least three clamps and there are at least three circumferentially-extending outer grooves.

Embodiment 13: the seal and clamping system of embodiment 11, wherein the clamping system comprises at least four clamps and there are at least four circumferentially-extending outer grooves.

The above elements of the seal/clamping system as well as others can be seen with reference to the figures. From the above description and figures, it will be seen that the present invention is well adapted to carry out the ends and advantages mentioned, as well as those inherent therein. While the presently preferred embodiment of the apparatus has been shown for the purposes of this disclosure, those skilled in the art may make numerous changes in the arrangement and construction of parts. All of such changes are encompassed within the scope and spirit of the appended claims.

Therefore, the present systems and methods are well adapted to attain the ends and advantages mentioned, as well as those that are inherent therein. The particular examples disclosed above are illustrative only, as the present systems and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While the systems and methods are described in terms of "comprising," "containing," "having," or "including" various components or steps, the compositions and methods can also, in some examples, "consist essentially of" or "consist of" the various components and steps. Also, the terms in the claims have their plain, ordinary meaning unless otherwise explicitly and clearly defined by the patentee.

What is claimed is:

1. A seal and clamping system for a wellhead assembly, wherein the wellhead assembly is of the type comprising:
   a top cap having a lower circumferential lip;
   a tubing head defining a central head bore, the tubing head having an upper section and lower section;
   a stripper adapter, the stripper adapter having;
      an upper end;
      a lower end;
      an outer adapter surface extending from the upper end to the lower end, wherein the outer adapter surface has a first outward-projecting shoulder between the upper end and lower end so as to define an upward facing ledge; and
      an inner adapter surface defining a central adapter bore, and
      wherein the upper end is configured to mate with the top cap such that the circumferential lip overlaps a first portion of the outer adapter surface at the upper end, and the lower end is configured to mate with the tubing head such that at the lower end the stripper adapter extends over the upper section of the tubing head so that the outer adapter surface at the lower end forms a second outward-projecting shoulder so as to define a downward facing ledge; and
   wherein the seal and clamping system comprises:
      a housing having:
         a first end configured to seal to the outer adapter surface above the first outward-projecting shoulder;
         a second end configured to seal to the tubing head below the second outward-projecting shoulder;
         an inner curved surface extending between the first end and the second end; and
         an outer curved surface extending between the first end and the second end; and
      a clamping system configured to hold the housing in position about the wellhead assembly so as to ensure sealing contact at the upper end and lower end with the wellhead assembly.

2. The seal and clamping system of claim 1, wherein the seal and clamping system further comprises:
   a seal system having an upper seal ring which seals the first end of the housing to the outer adapter surface, and a lower seal ring which seals the second end of the housing to the tubing head.

3. The seal and clamping system of claim 1, wherein the outer curved surface of the housing comprises a series of circumferentially-extending outer grooves spaced longitudinally apart on the outer curved surface, and wherein the clamping system is configured to mate with the series of spaced-apart circumferentially-extending outer grooves so as to hold the housing in mating position and in sealing contact with the wellhead assembly.

4. The seal and clamping system of claim 3, wherein the clamping system comprises a plurality of clamps with each one of the clamps corresponding to a respective one of the circumferentially-extending outer grooves.

5. The seal and clamping system of claim 4, wherein each of the clamps comprise:
   a first saddle having a first arched member which mates into a first portion of one of the circumferentially-extending outer grooves;
   a second saddle having a second arched member, which mates into a second portion of the one of the circumferentially-extending outer grooves; and
   a connector which connects the first saddle to the second saddle.

6. The seal and clamping system of claim 5, wherein:
   the first saddle further comprises a first tube at a first end of the first arched member and a second tube at a second end of the first arched member;
   the second saddle further comprises a first tube at a first end of the second arched member and a second tube at a second end of the second arched member; and
   the connector comprises a first bolt and a second bolt for joining the first arched member to the second arched member wherein, when so joined, the first bolt extends through the first tube of the first arched member and the first tube of the second arched member, and the second bolt extends through the second tube of the first arched member and the second tube of the second arched member.

7. The seal and clamping system of claim 1, wherein the housing comprises at least two mating portions which mate to form the housing.

8. The seal and clamping system of claim 7, wherein the mating portions have mating sides, and at least one of the mating sides has a notch, which facilitates separation of the mating portions.

9. The seal and clamping system of claim 7, wherein each mating portion has an upper inner groove at the first end of the inner curved surface, and a lower inner groove at the second end of the inner curved surface, and wherein when the mating portions are mated, the upper inner grooves of the mating portions form a circumferentially-extending upper inner groove and the lower inner grooves of the mating portions form a circumferentially-extending lower inner groove.

10. The seal and clamping system of claim 9, wherein the mating portions of the housing are configured to mate around the wellhead assembly, and when the seal and clamping system is so mated, the mating portions mate around the second portion of the outer adapter surface and an upper section of the tubing head so that the circumferentially-extending upper inner groove is above the first outward-projecting shoulder, and the circumferentially-extending lower inner grove is below the second outward projection shoulder.

11. The seal and clamping system of claim 10, wherein the seal and clamping system further comprises:
   a seal system having an upper seal ring, a lower seal ring and a plurality of longitudinal gaskets extending between the upper seal ring and lower seal ring; and wherein when the mating portions are mated the seal and clamping assembly is positioned such that the upper seal ring is in the upper inner groove, the lower seal ring is in the lower inner groove, and the longitudinal gaskets are positioned between the mating portions.

12. The seal and clamping system of claim 11, wherein the outer curved surface of the housing comprises a plurality of grooves spaced longitudinally apart on the outer curved surface, and wherein when the mating portions are mated, the outer grooves form a series of spaced-apart circumferentially-extending outer grooves and wherein the clamping system is configured to mate with the series of spaced-apart circumferentially-extending outer grooves so as to hold the housing in mating position and in sealing contact with the wellhead assembly.

13. The seal and clamping system of claim 12, wherein the clamping system comprises a plurality of clamps with each one of the clamps corresponding to a respective one of the circumferentially-extending outer grooves.

14. The seal and clamping system of claim 13, wherein each of the clamps comprise:
   a first saddle having a first arched member which mates into a first portion of one of the circumferentially-extending outer grooves;
   a second saddle having a second arched member, which mates into a second portion of the one of the circumferentially-extending outer grooves; and
   a connector which connects the first saddle to the second saddle.

15. The seal and clamping system of claim 14, wherein:
   the first saddle further comprises a first tube at a first end of the first arched member and a second tube at a second end of the first arched member;
   the second saddle further comprises a first tube at a first end of the second arched member and a second tube at a second end of the second arched member; and
   the connector comprises a first bolt and a second bolt for joining the first arched member to the second arched member wherein, when so joined, the first bolt extends through the first tube of the first arched member and the first tube of the second arched member, and the second bolt extends through the second tube of the first arched member and the second tube of the second arched member.

16. The seal and clamping system of claim 15, wherein the mating portions have mating sides, and at least one of the mating sides has a notch, which facilitates separation of the mating portions.

17. The seal and clamping system of claim 16, wherein the clamping system comprises at least three clamps and there are at least three circumferentially-extending outer grooves.

18. The seal and clamping system of claim 16, wherein the clamping system comprises at least four clamps and there are at least four circumferentially-extending outer grooves.

* * * * *